United States Patent
Sun et al.

(10) Patent No.: US 6,793,701 B2
(45) Date of Patent: Sep. 21, 2004

(54) AIR-LIQUID SEPARATING APPARATUS FOR COMPRESSED AIR

(76) Inventors: Yung-Yung Sun, P.O. Box 2103, Taichung (TW); Chuan-Ching Cheng, P.O. Box 2103, Taichung (TW)

( * ) Notice: Subject to any disclaimer, the term of this patent is extended or adjusted under 35 U.S.C. 154(b) by 0 days.

(21) Appl. No.: 10/615,942

(22) Filed: Jul. 10, 2003

(65) Prior Publication Data

US 2004/0007133 A1 Jan. 15, 2004

Related U.S. Application Data

(63) Continuation-in-part of application No. 10/102,635, filed on Mar. 22, 2002, now Pat. No. 6,616,719.

(51) Int. Cl.$^7$ .............................. B01D 5/00; B01D 49/00
(52) U.S. Cl. .................... 55/315.2; 55/338.1; 55/342.2; 55/392.1; 55/525; 55/DIG. 17; 95/256; 95/288; 96/189; 96/205
(58) Field of Search ............................ 55/315.2, 338.1, 55/342.2, 434.4, 525, 526, 392.1, DIG. 17; 95/256, 258, 288; 96/189, 205

(56) References Cited

U.S. PATENT DOCUMENTS

| | | | | |
|---|---|---|---|---|
| 2,586,002 A | * | 2/1952 | Carson, Jr. et al. ............ | 62/150 |
| 3,152,877 A | * | 10/1964 | Kaufman ........................ | 95/91 |
| 3,225,517 A | * | 12/1965 | Wachsmuth .................. | 95/122 |
| 3,226,948 A | * | 1/1966 | Alderson et al. ............. | 62/317 |
| 3,785,755 A | * | 1/1974 | Novak et al. ................. | 418/85 |
| 4,237,696 A | * | 12/1980 | Coblentz ....................... | 62/93 |
| 4,242,111 A | * | 12/1980 | Arends et al. ............. | 55/315.2 |
| 4,721,515 A | * | 1/1988 | Hata et al. .................... | 96/115 |
| 5,732,766 A | * | 3/1998 | Hunter et al. ................ | 165/111 |
| 5,993,522 A | * | 11/1999 | Huang .......................... | 96/294 |
| 6,616,719 B1 | * | 9/2003 | Sun et al. ................... | 55/315.2 |

FOREIGN PATENT DOCUMENTS

DE          3703271        *  5/1988  ............ 55/DIG. 17

* cited by examiner

*Primary Examiner*—Richard L. Chiesa

(57) ABSTRACT

An air-liquid separating apparatus for compressed air includes a cooling device adapted to be connected to an air source via a first transfer tube. The cooling device includes a liquid cooling tank filled with cooling agent and a cooling tube spiraled in the liquid cooling tank for condensing and separating the mist in the compressed air. An air-liquid separating tank is connected to the liquid cooling tank, wherein the compressed air is cooled and released again in the air-liquid separating tank. The air-liquid separating tank includes a backflow tube connected to the air-liquid separating tank for outputting the compressed air. The backflow tube is provided to carry the heat from the cooling device.

9 Claims, 5 Drawing Sheets

AIR-LIQUID SEPARATING APPARATUS FOR COMPRESSED AIR

CROSS-REFERENCE TO RELATED APPLICATION

This application is a Continuation-In-Part Application of Ser. No. 10/102,635, filed 22 Mar. 2002, and entitled "AIR-LIQUID SEPARATING APPARATUS FOR COMPRESSED AIR", now U.S. Pat. No. 6,616,719.

BACKGROUND OF THE INVENTION

1. Field of the Invention

The present invention relates to an air-liquid separating apparatus, and more particularly to an air-liquid separating apparatus for compressed air.

2. Description of Related Art

FIG. 5 shows a conventional air-liquid separating apparatus for compressed air in accordance with the prior art. In the embodiment, the compressed air from the air-compressor (81) passes through the transfer tube (82) and the cooling tube (84) for condensing the mist in the compressed air. The cooling tube (84) has a diameter greater than that of the transfer tube (82) such that the pressure value and the temperature value of the compressed air are suddenly reduced for condensing the mist in the compressed air when passing into the cooling tube (84). Furthermore, the cooling tube (84) is spiraled within a cooling tank (83) for elongating a stay time of the compressed air in the cooling tube for promoting the condensing effect of the cooling tube (84). The cooled compressed air flows into an air-liquid separating tank (85) by passing a second transfer tube (821) that communicates with the cooling tank (83) and the air-liquid separating tank (85). In the air-liquid separating tank (85), the water formed by the cooled compressed air falls toward a bottom of the air-liquid separating tank (85) and is departed from the compressed air. Consequently, the dry compressed air is provided to pneumatic tools via a third transfer tube (822) and an electric power is unnecessary to the conventional air-liquid separating apparatus for compressed air.

The cooling tank (83) of the conventional air-liquid separating apparatus has no extra heat dissipation device. Consequently, the temperature in the cooling tank (83) is gradually raised after being used for a continual operation. However, the cooling effect of the cooling tank (83) is greatly reduced when the temperature value in the cooling tank (83) is close to that of the compressed air from the cir-compressor (81).

The present invention has arisen to mitigate and/or obviate the disadvantages of the conventional air-liquid separating apparatus for compressed air.

SUMMARY OF THE INVENTION

The main objective of the present invention is to provide an improved air-liquid separating apparatus for compressed air. The air-liquid separating apparatus of the present invention can almost fully separate the mist from the compressed air.

To achieve the objective, the air-liquid separating apparatus in accordance with the present invention comprises a cooling device connected to an air source via a first transfer tube. The cooling device includes a liquid cooling tank filled with cooling agent and a cooling tube spiraled in the liquid cooling tank for condensing and separating the mist in the compressed air. An air-liquid separating tank is connected to the liquid cooling tank, wherein the compressed air is cooled and released again in the air-liquid separating tank. The air-liquid separating tank includes a backflow tube connected to the air-liquid separating tank for outputting the compressed air. The backflow tube is provided to carry the heat from the cooling device.

Further benefits and advantages of the present invention will become apparent after a careful reading of the detailed description with appropriate reference to the accompanying drawings.

DETAILED DESCRIPTION OF THE INVENTION

Figure 1:
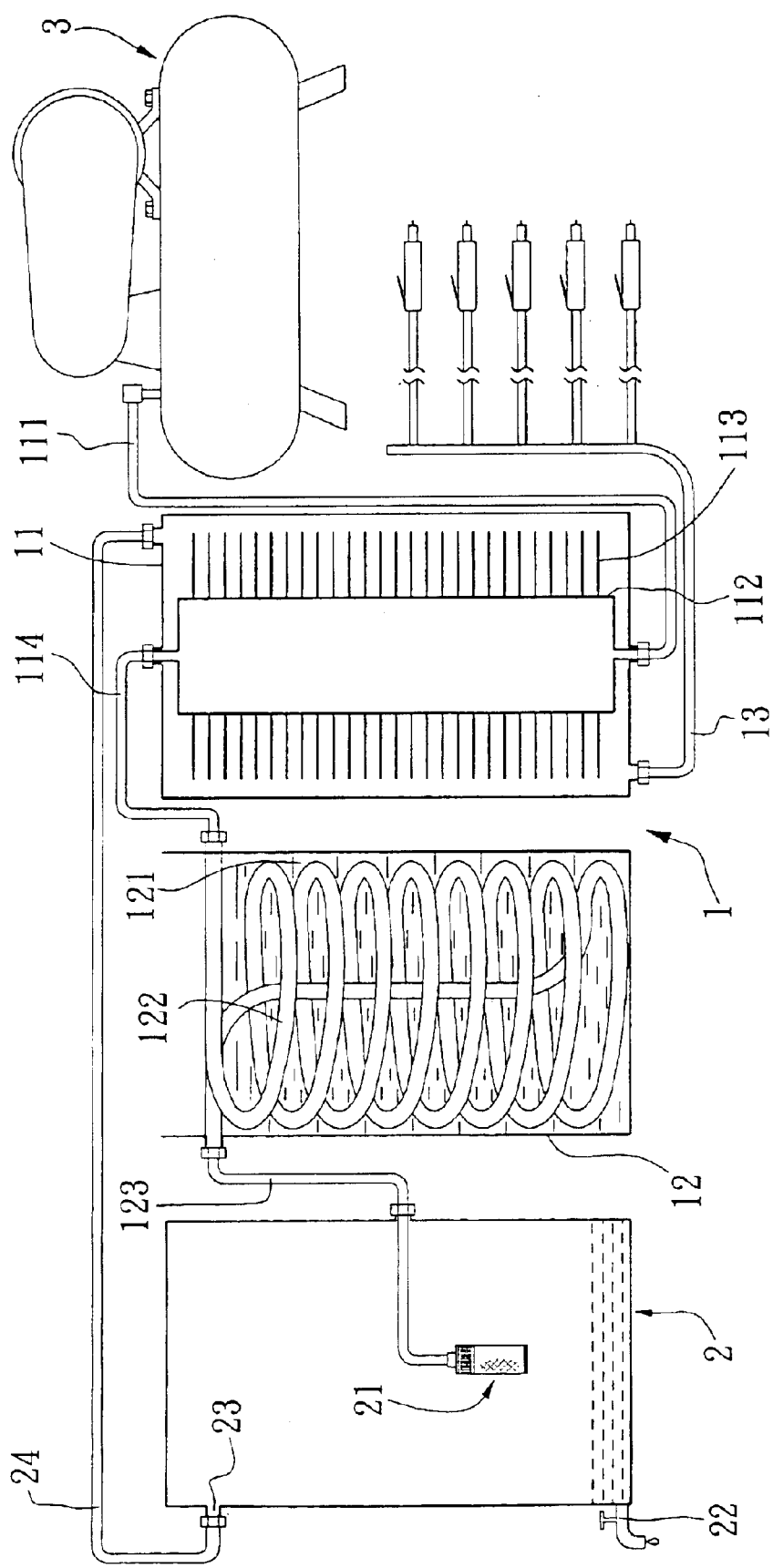
FIG. 1 is a plan view of an air-liquid separating apparatus for compressed air in accordance with the present invention.
Figure 2:
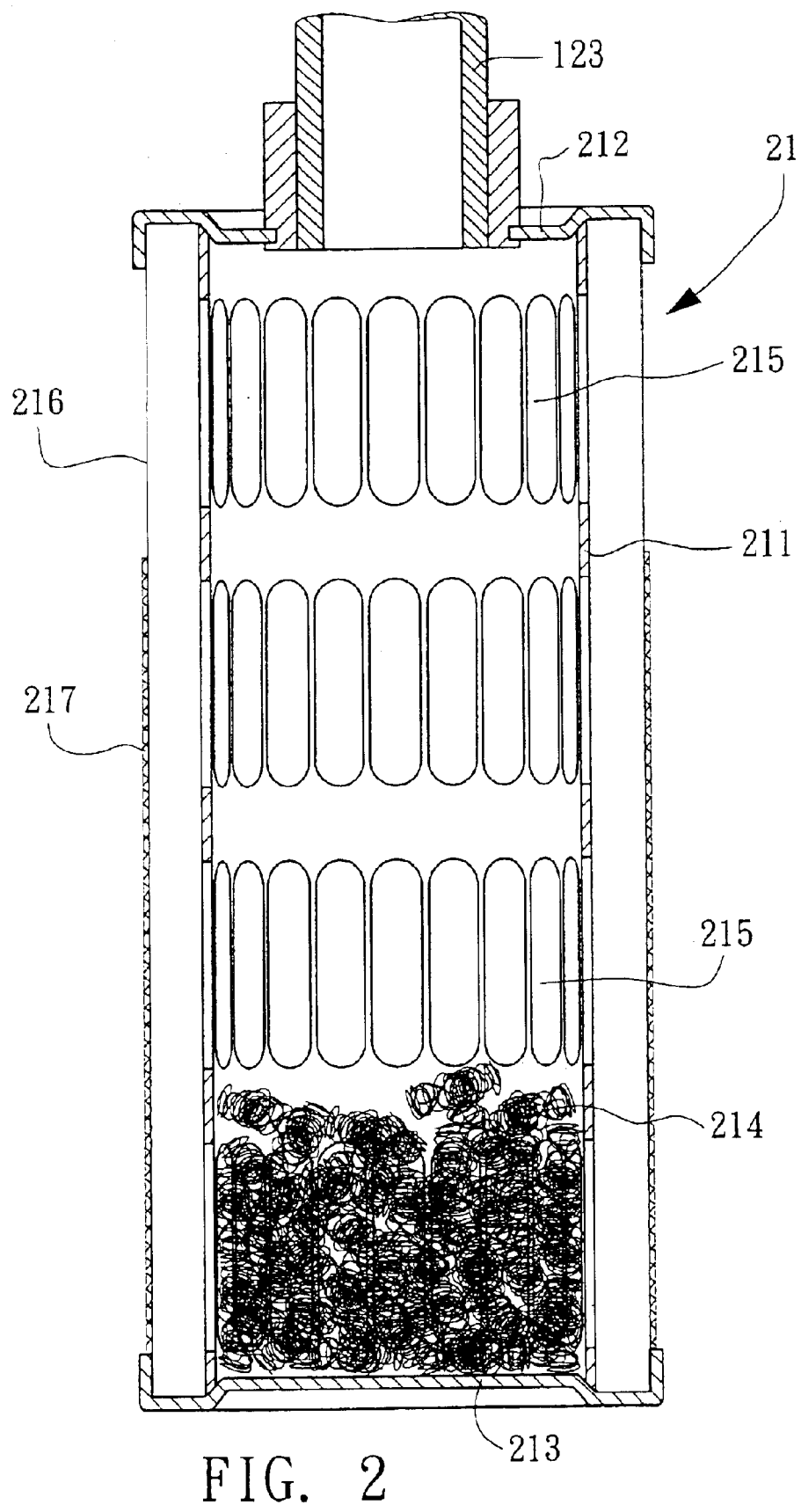
FIG. 2 is a side cross-sectional view of a water collector of the air-liquid separating apparatus in FIG. 1.
Figure 3:
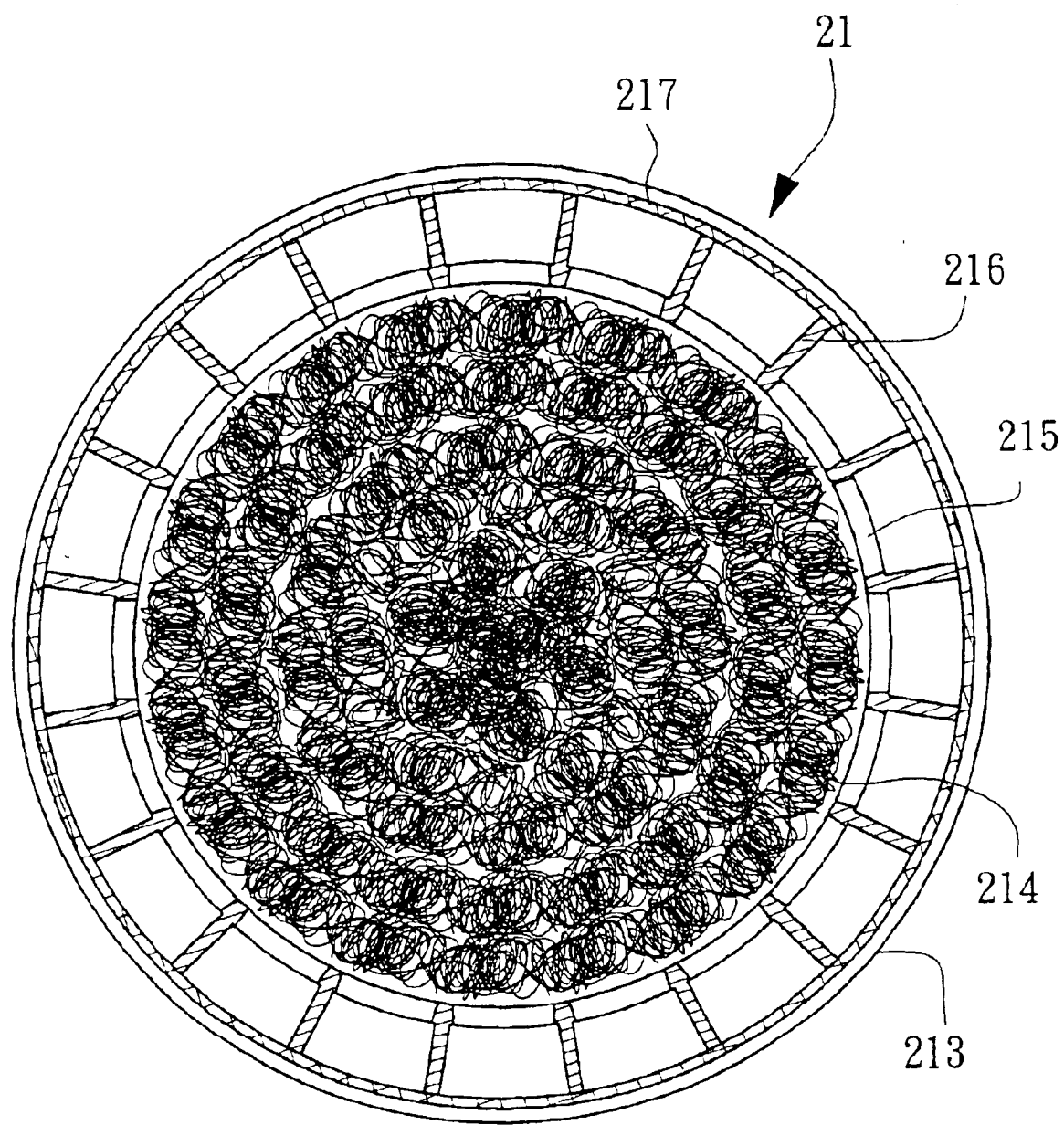
FIG. 3 is a top cross-sectional view of the water collector of the air-liquid separating apparatus in FIG. 1.

Referring to the drawings and initially to FIGS. 1–3, an air-liquid separating apparatus for compressed air in accordance with the present invention comprises a cooling device (1) adapted to be connected to an air compressor (3) via a first transfer tube (111) and an air-liquid separating tank (2) connected to the cooling device (1).

The cooling device (1) comprises at least two cooling tanks. In the preferred embodiment of the present invention, the cooling device (1) comprises an air-cooling tank (11) and a liquid cooling tank (12) connected to each other by a second transfer tube (114). The air-cooling tank (11) includes an inner tank (112) longitudinally mounted in the air-cooling tank (11). The inner tank (112) has a first end and a second end respectively extending through a bottom and a top of the air-cooling tank (11). The first transfer tube (111) has a first end adapted to communicate with the air compressor (3) and a second end communicating with the first end of the inner tank (112) to allow the compressed air pass through the first transfer tube (111) into the inner tank (112). The inner tank (112) includes multiple fins (113) radially extending from an outer periphery of the inner tank (112) for dissipating the heat of the inner tank (112). A second transfer tube (114) communicates with the inner tank (112) and the liquid cooling tank (12) that is filled with cooling agent (121). A cooling tube (122) is spiraled in the liquid cooling tank (12) and a first end and a second end respectively extending to an outer periphery of the liquid cooling tank (12). The second transfer tube (114) has a first end communicating with the second end of the inner tank (112) and a second end communicating with the first end of the cooling tube (122). The cooling tube (122) has a diameter greater than that of the second transfer tube (114) for condensing and separating the mist from the compressed air. A third transfer tube (123) connects the liquid cooling tank (12) and the air-liquid separating tank (2). The third transfer tube (123) has a first end communicating with the second end of the cooling tube and a second end extending into the air-liquid separating tank (2) parallel to an axis of the air-liquid separating tank (2).

A water collector (21) is received in the air-liquid separating tank (2) and longitudinally connected to the second end of the third transfer tube (123). The pressure value and the temperature value of the compressed air are suddenly reduced in the water collector (21) such that the mist of the compressed air is cooled down and condensed. The condensed mist is collected by the water collector (21) and falls to a bottom of the air-liquid separating tank (2) to achieve the objective of separating the liquid from the compressed air. The air-liquid separating tank (2) has a water drain (22) connected to the bottom thereof for draining the condensed water and an air outlet (23) defined in a top portion of the air-liquid separating tank (2).

A backflow tube (24) includes a first end communicating with the air drain (23) and a second end extending into the air-cooling tank (11) for leading the cooling compressed air into the air-cooling tank (11) and executing a heat exchange with the compressed air in the inner tank (112) for absorbing the heat from the inner tank (112). An output tube (13) includes a first end extending into the air-cooling tank (11) for exhausting the dry compressed air and a second end adapted to be connected to pneumatic tools (not numbered).

The water collector (21) is a cylindrical structure and includes a body (211). The water collector (21) includes a top plate (212) and a bottom plate (213) respectively secured on an upper portion and a lower portion for closing the body (211). The second end of the third transfer tube (132) extends through the top plate (212) of the water collector (21). A bank of steel wire velvet (214) is received in the body (211) and secured on the bottom plate (213). The bank of steel wire velvet (214) is provided to adhere the mist of the compressed air that longitudinally passes relative to the water collector (21). The body (211) includes multiple through holes (215) defined therein for the compressed air passing the body (211). The body (211) includes multiple partitions (216) radially extending from an outer periphery of the body (211) and a net (217) mounted around the body (211) and abutting the distal edge of the multiple partitions (216). The net (217) has multiple fine eyes (not numbered) for intercepting the mist of the compressed air that laterally passes relative to the water collector (21). The water collected by the water collector (21) drips down from the water collector (21) to the bottom of the air-liquid separating tank (2) and drained via the water drain (22).

To separate the mist from the compressed air, the compressed air releases its pressure and thermal energy when passing into the inner tank (112) via the first transfer tube (111). The thermal energy from the compressed air is transferred to the fins (113) of the inner tank (112) and carried by the dry compressed air in the air-cooling tank (11).

The compressed air, after being cooled one time, passes into the cooling tube (122) in the liquid cooling tank (12) via the second transfer tube (114). The cooling agent (121) condenses the compressed air and congeals the mist in the compressed air into tiny water drops. The compressed air with tiny water drops passes into the air-liquid separating tank (2) via the third transfer tube (123). The compressed air is sprayed toward the bottom of the water collector (2) because the second end of the third transfer tube (123) extends toward the bottom of the water collector (21). The compressed air releases the pressure thereof again when passing into the water collector (21) in the air-liquid separating tank (2). The tiny water drops are congealed into a greater water drops than the original condition thereof and adhered to the steel wire velvet (214) in the water collector (21) to separate the water from the compressed air due to the gravity. The dry compressed air laterally passes through the water collector (21) and the remaining mist in the compressed air is adhered to the net (217) for more thoroughly separating the moisture from the compressed air.

The dry compressed air passes into the air-cooling tank (11) for carrying the heat from the inner tank (112). Consequently, the compressed air is cooled before entering the liquid cooling tank (12) such that the temperature of the liquid cooling tank (12) can be maintained near that of the environment and the cooling effect is ensured.

The compressed air is cooled three times after passing through the air-liquid separating apparatus in accordance with the present invention such that the mist in the compressed air is almost fully separated from the compressed air and the dry compressed air can elongate the use life of pneumatic tools. Furthermore, the water collector (21) in the air-liquid separating tank (2) can further separate the remained mist from the compressed air to promote the effect of separating the water from the compressed air.

Figure 4:
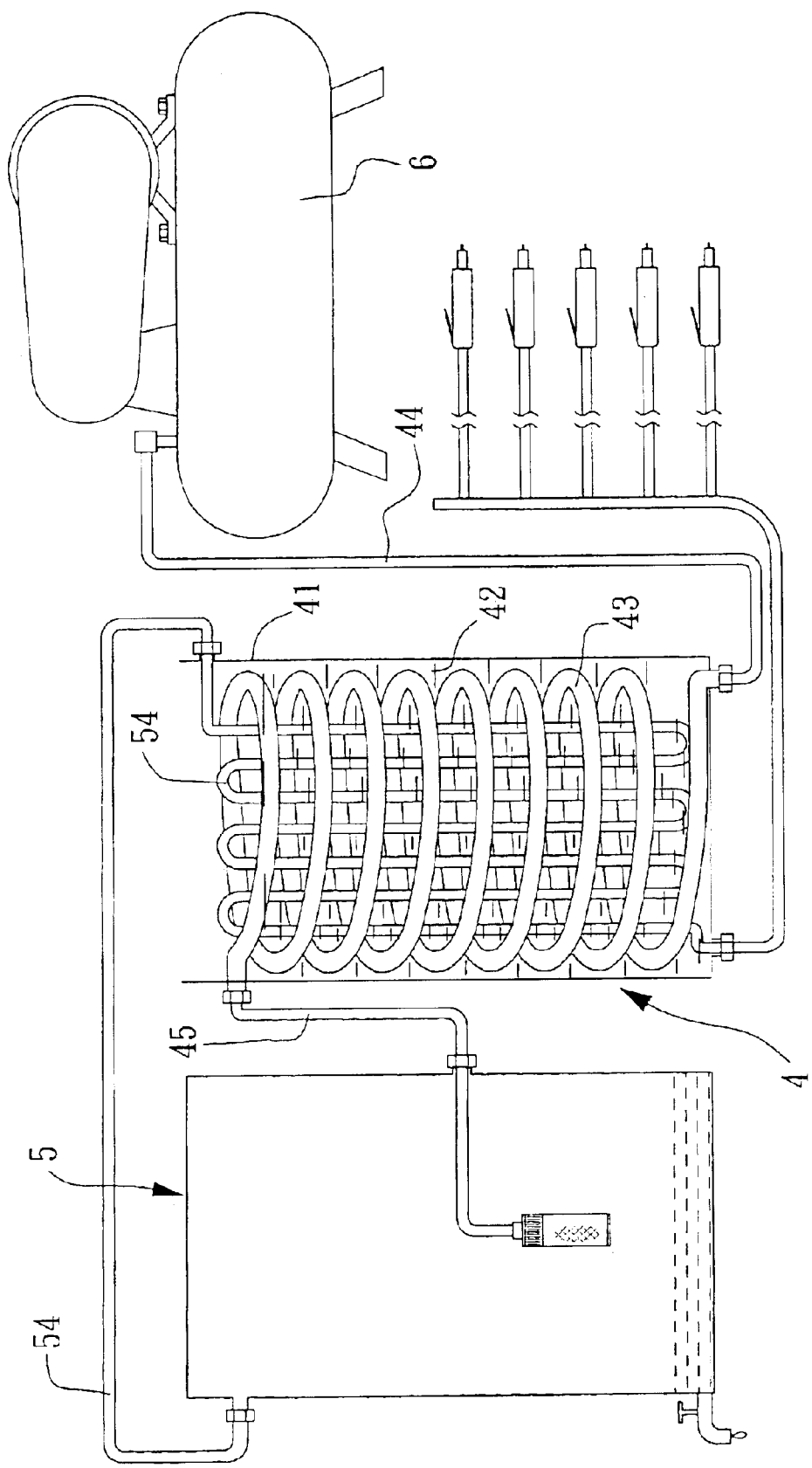
FIG. 4 is a plan view of a second embodiment of the air-liquid separating apparatus for compressed air in accordance with the present invention.
Figure 5:
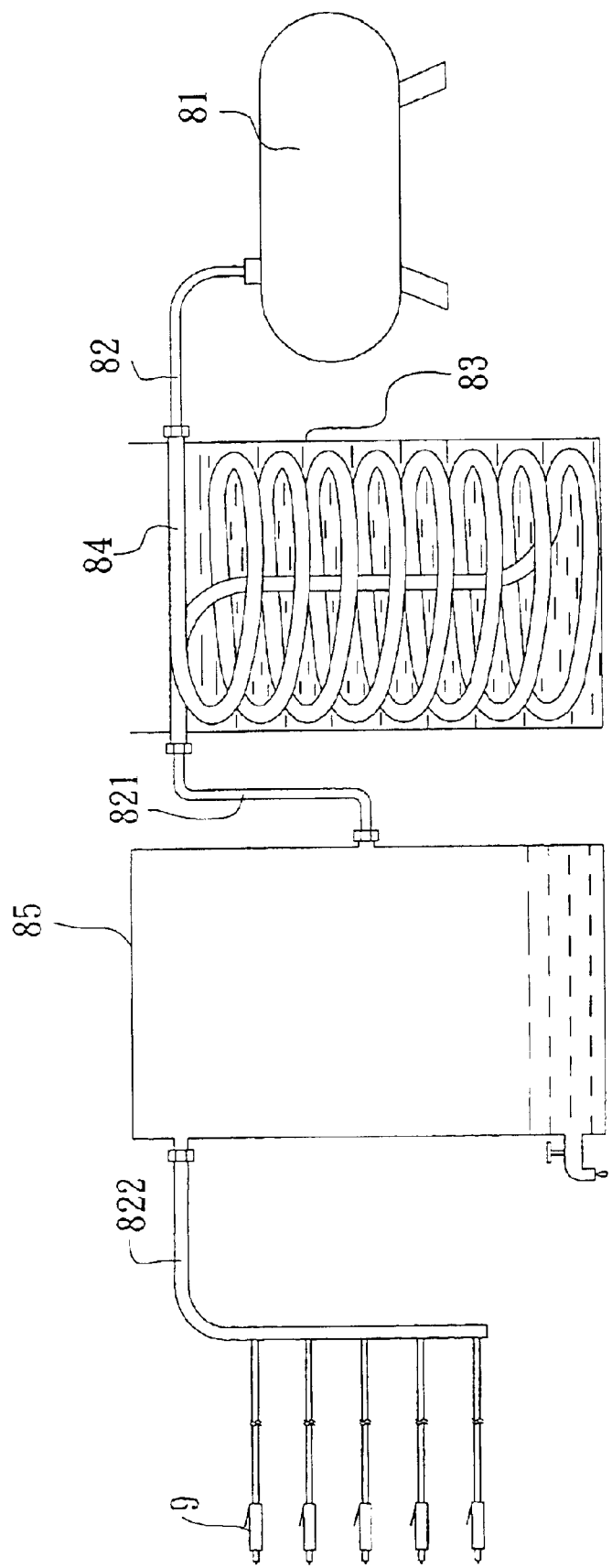
FIG. 5 is a plan view of a conventional air-liquid separating apparatus for compressed air in accordance with the prior art.

With reference to FIG. 4, a second embodiment of the air-liquid separating apparatus for compressed air in accordance with the present invention is shown. In the embodiment, the air-liquid separating apparatus has only one cooling tank (41) that is filled with cooling agent (42). A cooling tube (43) is spiraled in the cooling tank (41) and has a first end and a second end respectively extending through the cooling tank (41). A first transfer tube (44) has a first end adapted to be connected to an air compressor (6) and a second end connected to the first end of the cooling tube (43) for allowing the compressed air to pass into the cooling tube (43). A second transfer tube (45) has a first end connected to the second end of the cooling tube (43) and a second end extending into an air-liquid separating tank (5) for allowing the cooled compressed air to pass into the air-liquid separating tank (5). A backflow tube (54) is partially bent within the spiraled cooling tube (43) for executing heat exchange to dissipate the heat from the cooling tube (43). The backflow tube (54) has a first end communicating with the air-liquid separating tank (5) and a second end extending through the cooling tank (41). The second end of the backflow tube (54) is adapted to be connected to pneumatic tools.

Although the invention has been explained in relation to its preferred embodiment, it is to be understood that many other possible modifications and variations can be made without departing from the spirit and scope of the invention as hereinafter claimed.

What is claimed is:

1. An air-liquid separating apparatus for compressed air, comprising:
   a cooling device adapted to be connected to an air source via a first transfer tube, the cooling device including:
      a liquid cooling tank filled with cooling agent;
      a cooling tube spiraled in the liquid cooling tank for condensing and separating the mist in the compressed air, the cooling tank having a first end and a second end respectively extending through the liquid cooling tank, the first end of the cooling tube connected to the first transfer tube; and
      a second transfer tube having a first end connected the second end of the cooling tube and a second end opposite to the first end of the second transfer tube; and
   an air-liquid separating tank connected to the liquid cooling tank, the second end of the second transfer tube extending into the air-liquid separating tank toward a bottom of the air-liquid separating tank, wherein the compressed air is cooled and released again in the air-liquid separating tank, the air-liquid separating tank including:
- a water drain connected to the bottom of the air-liquid separating tank for draining the condensed water;
- an air outlet defined in a top portion of the air-liquid separating tank for exhausting the compressed air; and
- a backflow tube having a first end connected to the air outlet and a second end for outputting the compressed air, the backflow tube provided to carry the heat from the cooling device.

2. The air-liquid separating apparatus as claimed in claim 1, wherein the backflow tube is partially received in the liquid cooling tank and bent within the cooling tube.

3. The air-liquid separating apparatus as claimed in claim 1 further comprising an air-cooling tank disposed between the liquid cooling tank and an air compressor, the air-cooling tank including:
- an inner tank longitudinally mounted in the air-cooling tank, the inner tank has a first end and a second end respectively extending through a bottom and a top of the air-cooling tank, wherein the first transfer tube has a first end connected to the second end of the inner tank and a second end connected to the first end of the cooling tube, and the second end of the backflow tube is connected to the air-cooling tank for providing a cooled compressed air into the air-cooling tank to dissipate the heat from the inner tank;
- a transfer tube having a first end adapted to be connected to the air compressor and a second end connected to the first end of the inner tank for allowing the compressed air to pass into the inner tank;
- multiple fins radially extending from an outer periphery of the inner tank for dissipating the heat from the inner tank; and
- an output tube having a first end extending into the air-cooling tank for exhausting the compressed air and a second end adapted to be connected to pneumatic tools.

4. The air-liquid separating apparatus as claimed in claim 1, wherein the cooling tube has a diameter greater than that of the first transfer tube such that a pressure value of the compressed air is suddenly reduced.

5. The air-liquid separating apparatus as claimed in claim 1, wherein the air-liquid separating tank comprises a water collector received therein and longitudinally connected to the second end of the second transfer tube for cooling down and condensing the compressed air.

6. The air-liquid separating apparatus as claimed in claim 3, wherein the cooling tube has a diameter greater than that of the first transfer tube such that a pressure value of the compressed air is suddenly reduced.

7. The air-liquid separating apparatus as claimed in claim 3, wherein the air-liquid separating tank comprises a water collector received therein and longitudinally connected to the second end of the second transfer tube for cooling down and condensing the compressed air.

8. The air-liquid separating apparatus as claimed in claim 5, wherein the water collector is a cylindrical structure and comprises:
- a body connected to the second end of the second transfer tube;
- a top plate and bottom plate respectively secured on an upper portion and a lower portion for closing the body;
- a bank of steel wire velvet received in the body and secured on the bottom plate, the bank of steel wire velvet provided to adhere the mist of the compressed air that longitudinally passes relative to the water collector;
- multiple through holes defined in the body for the compressed air passing the body;
- multiple partitions radially extending from an outer periphery of the body; and
- a net mounted around the body and abutting a distal edge of each of the multiple partitions, the net having multiple fine eyes for intercepting the mist of the compressed air that laterally passes relative to the water collector.

9. The air-liquid separating apparatus as claimed in claim 7, wherein the water collector is a cylindrical structure and comprises:
- a body connected to the second end of the second transfer tube;
- a top plate and bottom plate respectively secured on an upper portion and a lower portion for closing the body;
- a bank of steel wire velvet received in the body and secured on the bottom plate, the bank of steel wire velvet provided to adhere the mist of the compressed air that longitudinally passes relative to the water collector;
- multiple through holes defined in the body for the compressed air passing the body;
- multiple partitions radially extending from an outer periphery of the body; and
- a net mounted around the body and abutting a distal edge of each of the multiple partitions, the net having multiple fine eyes for intercepting the mist of the compressed air that laterally passes relative to the water collector.

* * * * *